US007607164B2

(12) United States Patent
Vasishth et al.

(10) Patent No.: US 7,607,164 B2
(45) Date of Patent: Oct. 20, 2009

(54) SYSTEMS AND PROCESSES FOR MANAGING POLICY CHANGE IN A DISTRIBUTED ENTERPRISE

(75) Inventors: Karan Vasishth, Redmond, WA (US); Kimberley Ann Hunter, Snoqualmie, WA (US); Laurie A. Brown, Stanwood, WA (US); Mark David Lawrence, Duvall, WA (US); Matthias Leibmann, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 11/021,746

(22) Filed: Dec. 23, 2004

(65) Prior Publication Data

US 2006/0143685 A1   Jun. 29, 2006

(51) Int. Cl.
   *H04L 9/00* (2006.01)
(52) U.S. Cl. .................. 726/1; 709/223; 709/225
(58) Field of Classification Search .......... 726/1; 705/1
   See application file for complete search history.

(56) References Cited

U.S. PATENT DOCUMENTS

| 5,717,911 | A | | 2/1998 | Madrid et al. |
| 5,717,924 | A | | 2/1998 | Kawai |
| 5,881,225 | A | | 3/1999 | Worth |
| 5,889,953 | A | * | 3/1999 | Thebaut et al. ............. 709/221 |
| 5,911,143 | A | | 6/1999 | Deinhart et al. |
| 6,006,328 | A | | 12/1999 | Drake |
| 6,073,242 | A | | 6/2000 | Hardy et al. |
| 6,167,445 | A | * | 12/2000 | Gai et al. ................... 709/223 |
| 6,192,405 | B1 | | 2/2001 | Bunnell |
| 6,334,121 | B1 | | 12/2001 | Primeaux et al. |
| 6,389,589 | B1 | | 5/2002 | Mishra et al. |
| 6,393,473 | B1 | * | 5/2002 | Chu ............................ 709/223 |
| 6,490,680 | B1 | | 12/2002 | Scheidt et al. |
| 6,523,027 | B1 | | 2/2003 | Underwood |
| 6,633,878 | B1 | | 10/2003 | Underwood |
| 6,751,657 | B1 | * | 6/2004 | Zothner ..................... 709/220 |
| 6,792,462 | B2 | | 9/2004 | Bernhardt et al. |
| 7,062,537 | B2 | | 6/2006 | Aziz et al. |
| 7,100,195 | B1 | | 8/2006 | Underwood |
| 7,171,459 | B2 | * | 1/2007 | Sanghvi et al. ............. 709/223 |
| 7,185,192 | B1 | | 2/2007 | Kahn |
| 7,194,631 | B2 | | 3/2007 | Numano |
| 7,237,191 | B1 | | 6/2007 | Sulistio et al. |
| 7,240,015 | B1 | * | 7/2007 | Karmouch et al. ............ 705/4 |
| 7,409,447 | B1 | * | 8/2008 | Assadzadeh ............... 709/225 |

(Continued)

OTHER PUBLICATIONS

Marriott et al, "Management Policy Service for Distributed Systems", IEEE, 1996, pp. 2-9.*

(Continued)

*Primary Examiner*—Ponnoreay Pich
(74) *Attorney, Agent, or Firm*—Lee & Hayes, PLLC

(57) ABSTRACT

A method for managing changes to policies in an enterprise includes receiving a systems policy change request to change a systems policy that implements a published enterprise policy, determining whether the requested systems policy change complies with the published enterprise policy, and updating the systems policy according to the requested systems policy change if the requested systems policy change complies with the published enterprise policy. A system for managing policies in an enterprise includes a policy management module configured for receiving published policies and generating corresponding systems policies having data for implementing the published policies, and a policy library storing the published policies and the systems policies.

19 Claims, 5 Drawing Sheets

U.S. PATENT DOCUMENTS

| | | | |
|---|---|---|---|
| 7,490,073 | B1 | 2/2009 | Qureshi et al. |
| 2001/0034733 | A1 | 10/2001 | Prompt et al. |
| 2002/0147801 | A1* | 10/2002 | Gullotta et al. ............. 709/223 |
| 2002/0184485 | A1 | 12/2002 | Dray et al. |
| 2003/0115179 | A1* | 6/2003 | Prabakaran et al. ............. 707/1 |
| 2003/0115322 | A1* | 6/2003 | Moriconi et al. ............ 709/224 |
| 2004/0054565 | A1 | 3/2004 | Nemecek et al. |
| 2004/0103073 | A1 | 5/2004 | Blake et al. |
| 2004/0111643 | A1* | 6/2004 | Farmer ....................... 713/201 |
| 2004/0148299 | A1 | 7/2004 | Teegan et al. |
| 2004/0204949 | A1* | 10/2004 | Shaji et al. ..................... 705/1 |
| 2004/0210662 | A1 | 10/2004 | Lim et al. |
| 2005/0060342 | A1 | 3/2005 | Farag |
| 2005/0071359 | A1 | 3/2005 | Elandassery et al. |
| 2005/0086126 | A1 | 4/2005 | Patterson |
| 2005/0091269 | A1 | 4/2005 | Gerber et al. |
| 2005/0139649 | A1 | 6/2005 | Metcalf et al. |
| 2005/0144019 | A1 | 6/2005 | Murakami et al. |
| 2005/0149450 | A1 | 7/2005 | Stefik et al. |
| 2005/0149552 | A1 | 7/2005 | Chan et al. |
| 2005/0187957 | A1 | 8/2005 | Kramer et al. |
| 2005/0278431 | A1* | 12/2005 | Goldschmidt et al. ....... 709/207 |
| 2005/0289072 | A1 | 12/2005 | Sabharwal |
| 2006/0031757 | A9 | 2/2006 | Vincent, III |
| 2006/0048218 | A1* | 3/2006 | Lingafelt et al. .............. 726/11 |
| 2006/0048236 | A1 | 3/2006 | Multerer et al. |
| 2006/0059128 | A1 | 3/2006 | Ruggle et al. |
| 2006/0107046 | A1 | 5/2006 | Raley et al. |
| 2006/0129589 | A1 | 6/2006 | Thornton et al. |
| 2006/0155725 | A1 | 7/2006 | Foster et al. |
| 2007/0124797 | A1* | 5/2007 | Gupta et al. .................... 726/1 |

OTHER PUBLICATIONS

"Understanding Active Directory Replication", 2000, pp. 171-179.

Velegrakis, et al., "Preserving Mapping Consistency Under Schema Changes", Springer-Verlag, 2004, pp. 274-293.

Ferraiolo, et al, "A Role-Based Access Control Model and Reference Implementation within a Corporate Intranet", ACM Transactions on Information and System Security, vol. 2, No. 1, Feb. 1999, pp. 34-64.

Ferraiolo, et al, "Proposed NIST Standard for Role-Based Access Control", ACM Transactions on Information and System Security, vol. 4, No. 3, Aug. 2001, pp. 224-274.

Sandhu, et al, "The NIST Model for Role-Based Access Control: Towards a Unified Standard", pp. 1-17, publication year: 2000.

Schneider, "Enforceable Security Policies", ACM Transactions on Information and System Security, vol. 3, No. 1, Feb. 2000, pp. 30-50.

* cited by examiner

| Policy Library – Corporate Network Domain (sample) ||
|---|---|
| Policy Name | WW-DOMAIN-PASSWORD-REQUIREMENTS GPO |
| Root | Domain Root — 202 |
| Purpose | To Enforce PWD Complexity Standards |
| Filter (apply) To | Authenticated Users |
| Requested By | Identity Management Team |
| Request Date | 9/19/1999 |
| Expiration Date | NONE |
| Deployment Date | 1/1/2001 |
| Policy Contact | mailto:Identity.Management@Company.com |
| Policy Name | OU-LAB-ANTIVIRUS GPO — 204 |
| Root | cn=Labs, dn=Corporate, dn=Company, dn=com |
| Purpose | To Enforce Antivirus deployment to lab systems |
| Filter (apply) To | Authenticated Users |
| Requested By | Lab Leadership Team |
| Request Date | 9/19/1999 |
| Expiration Date | 5/6/2007 |
| Deployment Date | 1/1/2001 |
| Policy Contact | mailto:Identity Management@Company.com |

*Fig. 2*

SYSTEMS AND PROCESSES FOR MANAGING POLICY CHANGE IN A DISTRIBUTED ENTERPRISE

CROSS-REFERENCE TO RELATED APPLICATIONS

The present application is related to concurrently filed U.S. patent application Ser. No. 11/021,745 entitled "SCHEMA CHANGE GOVERNANCE FOR IDENTITY STORE", U.S. patent application Ser. No. 11/021,865 entitled "SYSTEMS AND PROCESS FOR SELF-HEALING AN IDENTITY STORE", and U.S. patent application Ser. No. 11/021,750 entitled "MANAGING ELEVATED RIGHTS ON A NETWORK", which are assigned to the Assignee of the present application, and incorporated herein by reference for all that they disclose.

BACKGROUND

Enterprises, such as corporations and other organizations, typically define policies for purposes of enterprise management. Enterprise management refers to the identification and management of users and network-based resources, such as computers. Typically, policies designate whether access to a resource is entitled or privileged. Privileged access to the resource must be justified in some way, typically based on user role, responsibility, or business need. The enterprise policies define boundaries or scope of privileged and entitled access permissions.

Such policies are typically a combination of "business/security policies" and "systems policies". Business/security policies (also called "published policies") define general guidelines for access to network-based resources, including secure access, and restrictions on use. Systems policies (also called "configured policies") present the mechanism for implementing the business policies into enforceable system and user configurations. Available platforms provide architectures to implement policies. For example, WINDOWS ACTIVE DIRECTORY from MICROSOFT CORPORATION implements system policies using Group Policy Objects (GPOs).

Using conventional approaches, policies can be conveniently configured in one-to-all, one-to-many, and one-to-specific arrangements with respect to users and resources. In such approaches, policy stores store the various enterprise policies. In a distributed enterprise, each domain or group of users/resources, typically has its own instance of the policies, with which the domain uses to enforce the enterprise guidelines.

Unfortunately, conventional approaches to policy implementation are not very flexible or responsive to growth and change of policies within the enterprise. Generally, securing and otherwise managing access to the network-based resources involves making and managing an increasing number of policies. When managing multiple distributed groups of resources and users, such as multiple domains in an ACTIVE DIRECTORY, multiple policy stores often exist, which can cause conflicts in policy naming and scope, as well as inconsistencies among implementation settings. In addition, in the case of ACTIVE DIRECTORY, policies are replicated between domain controllers, rather than having one centralized policy store. If the replicated policies are not diligently maintained, user access can become inconsistent, thereby undermining the intent of the published policies.

SUMMARY

Implementations of systems and methods described herein enable policy management such that the systems policies remain consistent with existing published policies within an enterprise. When a user requests a change to a systems policy, a process is performed that checks whether the requested change will violate an existing published policy. The check can be performed using reference links that associate published policies and systems policies. If the requested change violates a published policy, the requested change will be rejected; otherwise, the requested systems change will be approved and implemented.

BRIEF DESCRIPTION OF THE FIGURES

FIG. 2 illustrates an exemplary policy library;

DETAILED DESCRIPTION

Described herein are various implementations of systems and methods for facilitating systems policy changes in a distributed enterprise. In accordance with various implementations described herein, a systems policy relates to settings required to carry out a published policy. A published policy is any policy that specifies guidelines for entities within the enterprise. Systems policies are related to published policies in a one-to-many association or a one-to-one association. Processes and systems described herein utilize the association(s) between systems policy and published policy and/or policy exception to facilitate requested changes to the system policies, and to ensure that the published policies continue to be carried out by the systems policies, despite the changes.

In one implementation, an information technology (IT) center receives the published policies and creates associations between the published policies and systems policies. The IT center determines the settings and data that need to be applied to users, computers, and other resources within the enterprise to carry out the published policies. When a user requests a change to a systems policy, a process is followed that ensures that if the requested change is made, the associated published policies are not violated. A policy exception can be generated corresponding to a systems policy that is not associated with any published policies. In addition, data is maintained that enables the IT center to manage the life cycle of enterprise policies.

Figure 1:
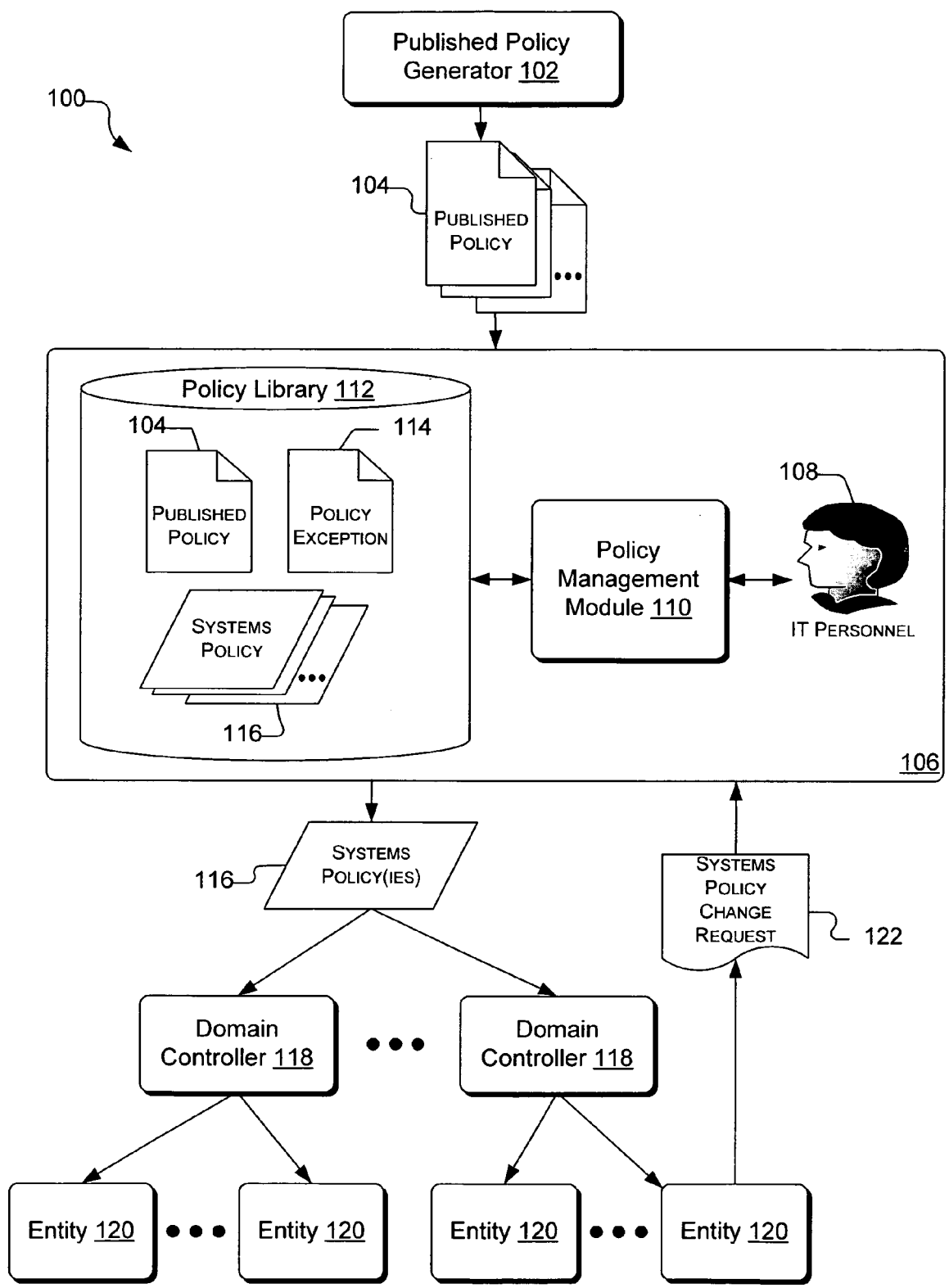
FIG. 1 illustrates an exemplary distributed enterprise wherein a policy change governance system and process can be employed.

FIG. 1 illustrates an exemplary distributed enterprise 100 wherein policies are generated and implemented to enforce guidelines, procedure, and rules for enterprise management. As used herein, an enterprise is an organization, such as, but not limited to, a corporation, which includes entities, such as, but not limited to, computers, users, user accounts, files, application programs, printers, and other resources. Policies set forth principles for managing access to, configuration of, and interaction among the entities. The enterprise 100 is distributed, meaning that the entities may be geographically dispersed from each other and responsibilities may be divided among entities and/or groups of entities. Typically, entities within the distributed enterprise 100 communicate via a communication network (not shown).

A published policy generator(s) 102 generates one or more published policies 104. One implementation of the published policy generator 102 is composed of one or more groups of entities with the enterprise 100 that create published policies regarding various aspects of the enterprise 100. For example, an accounting group can set forth published policies related to corporate assets; a human resources group may set forth published policies related to employee information, such as social security numbers; a corporate security group may set forth published policies dictating when and how user's are to access the computer network.

Exemplary published policies 104 include, but are not limited to the following:

User passwords shall be greater than seven characters long.
User passwords shall be a complex password, including at least one upper case letter, one lower case letter, and one number.
User passwords shall be updated at least once every seventy days.
Each user is allowed to use a licensed copy of specified application programs (e.g., MICROSOFT OFFICE).
Each computer shall run antivirus software that scans the hard drive periodically.
By default, each user shall have basic rights to access specified default network resources.
A user may be given elevated rights to access more than default network resources, if the user shows a responsibility-based need for elevated rights.

The published policies 104 are published somewhere within the enterprise 100. Typically, the published policies 104 are published in electronic form, whereby the policies 104 can be made available on a network, such as an intranet. However, the published policies 104 can be published in any other format, including, but not limited to, paper publications.

The published policy generator 102 communicates (e.g., via network) the one or more published polices 104 to an information technology center 106, which manages policies within the enterprise 100. Typically, the IT center 106 includes IT personnel 108 and a policy management module 110, which perform various processes for managing and implementing the published policies 104. IT personnel 108 include, by way of example, but not limitation, system administrators and system security personnel.

In one implementation, the policy management module 110 is embodied in a server computer through which the IT personnel 108 manage the enterprise policies. In this implementation, the policy management module 110 is used to enter the policy-related data into a policy library 112. The policy library 112 may reside in computer memory, a database, or other storage devices in communication with the policy management module 110. By way of example, but not limitation, the policy library 112 can be implemented in a structured query language (SQL) database on a server computer. Any policy-related data can be stored in the policy library 112 as may be suitable to a particular implementation. Exemplary policy library data are shown in FIG. 2, and discussed further below.

In accordance with one implementation of the IT center 106, the policy library 112 includes the published policies 104, one or more policy exceptions 114, and systems policies 116. Systems policies 116 represent implementation data or settings required to implement or carry out the published policies 104. Thus, one or more systems policies 116 may correspond to each published policy 104. In addition, systems policies 116 that are not in exact compliance with the published policies 104, but are nonetheless allowable systems policies 116, may be associated with corresponding policy exception(s) 114. Policy exceptions 114 are discussed in further detail below.

The IT personnel 108 can manage the policies through the policy management module 110 in a number of different, useful ways. For example, the policy management module 110 can be used to create and/or edit the systems policies 116 and the policy exceptions 114, to create associations between the systems policies 116 and the published policies 104 and/or the policy exceptions 114, and to deploy the systems policies 116 throughout the enterprise 100.

Systems policies 116 are configured policies that represent the implementation of the published policies 104 and policy exceptions 114. System policies 116 are applied to domains and entities within the enterprise 100 to enforce the published policies 104. For example, a systems policy 116 may contain configuration information, instructions, settings, application program instructions, and the like, which configure a user's computer in accordance with published policies 104. The systems policies 116 are typically provided in a container (e.g., file) in a predetermined format. An exemplary systems policy 116 for use in a Group Policy Object in MICROSOFT CORPORATION'S ACTIVE DIRECTORY is shown below:

Example of Two Specific Policies for
 a) Account Policies/Password Policy—6 settings
 b) Account Policy/Account Lockout Policy—3 settings

| Computer Configuration [Enabled] Windows Settings Security Settings | |
|---|---|
| Policy | Setting |
| Account Policies/Password Policy | |
| Enforce password history | 24 passwords remembered |
| Maximum password age | 70 days |
| Minimum password age | 1 days |
| Minimum password length | 14 characters |
| Password must meet complexity requirements | Enabled |
| Store passwords using reversible encryption | Disabled |
| Account Policies/Account Lockout Policy | |
| Account lockout duration | 0 minutes |
| Account lockout threshold | 5 invalid logon attempts |
| Reset account lockout counter after | 30 minutes |

Example of a Complete Policy Description for a Active Directory Domain

| Managed Forest Default Domain Policy | | |
|---|---|---|
| Data collected on: 10/18/2004 5:21:59 PM Generalhide | | show all |
| Detailsshow | | |
| Domain | IDMMSNBC.nttest.microsoft.com | |
| Owner | IDMMSNBC\Domain Admins | |
| Created | 10/18/2004 3:14:32 PM | |
| Modified | 10/18/2004 3:34:46 PM | |
| User Revisions | 1 (AD), 1 (sysvol) | |

-continued

Managed Forest Default Domain Policy

| | |
|---|---|
| Computer Revisions | 205 (AD), 205 (sysvol) |
| Unique ID | {0C46799D-0866-4A7E-9E04-C8D697EA9C0F} |
| GPO Status | Enabled |

Linksshow

| Location | Enforced | Link Status | Path |
|---|---|---|---|
| Managed | No | Enabled | IDMMSNBC.nttest.microsoft.com/Managed |

This list only includes links in the domain of the GPO.

Security Filteringshow

The settings in this GPO can only apply to the following groups, users, and computers:
Name
NT AUTHORITY\Authenticated Users

WMI Filteringshow

| WMI Filter Name | None |
|---|---|
| Description | Not applicable |

Delegationshow

These groups and users have the specified permission for this GPO

| Name | Allowed Permissions | Inherited |
|---|---|---|
| IDMMSNBC\Domain Admins | Edit settings, delete, modify security | No |
| IDMMSNBC\Enterprise Admins | Edit settings, delete, modify security | No |
| NT AUTHORITY\Authenticated Users | Read (from Security Filtering) | No |
| NT AUTHORITY\ENTERPRISE DOMAIN CONTROLLERS | Read | No |
| NT AUTHORITY\SYSTEM | Edit settings, delete, modify security | No |

Computer Configuration (Enabled)hide

Windows Settingshide

| Policy | Setting |
|---|---|

Security Settingshide
Account Policies/Password Policyhide

| | |
|---|---|
| Enforce password history | 24 passwords remembered |
| Maximum password age | 70 days |
| Minimum password age | 1 days |
| Minimum password length | 14 characters |
| Password must meet complexity requirements | Enabled |
| Store passwords using reversible encryption | Disabled |

Account Policies/Account Lockout Policyhide

| | |
|---|---|
| Account lockout duration | 0 minutes |
| Account lockout threshold | 5 invalid logon attempts |
| Reset account lockout counter after | 30 minutes |

Account Policies/Kerberos Policyshow

| | |
|---|---|
| Enforce user logon restrictions | Enabled |
| Maximum lifetime for service ticket | 600 minutes |
| Maximum lifetime for user ticket | 10 hours |
| Maximum lifetime for user ticket renewal | 7 days |
| Maximum tolerance for computer clock synchronization | 5 minutes |

Local Policies/Audit Policyshow

| | |
|---|---|
| Audit account logon events | Success, Failure |
| Audit account management | Success, Failure |
| Audit directory service access | Failure |
| Audit logon events | Success, Failure |
| Audit object access | Failure |
| Audit policy change | Success, Failure |
| Audit privilege use | Failure |
| Audit process tracking | Failure |
| Audit system events | Success, Failure |

Local Policies/Security Optionsshow
Accountsshow

| | |
|---|---|
| Accounts: Guest account status | Disabled |
| Accounts: Limit local account use of blank passwords to console logon only | Disabled |

Devicesshow

| | |
|---|---|
| Devices: Restrict floppy access to locally logged-on user only | Enabled |
| Devices: Unsigned driver installation behavior | Warn but allow installation |

Domain Controllershow

| | |
|---|---|
| Domain controller: LDAP server signing requirements | Require signing |

Domain Membershow

| | |
|---|---|
| Domain member: Digitally encrypt or sign secure channel data (always) | Enabled |
| Domain member: Maximum machine account password age | 30 days |
| Domain member: Require strong (Windows 2000 or later) session key | Enabled |

Interactive Logonshow

| | |
|---|---|
| Interactive logon: Do not display last user name | Enabled |
| Interactive logon: Do not require CTRL+ALT+DEL | Disabled |
| Interactive logon: Message text for users attempting to log on | Define a legal caption here. |
| Interactive logon: Message title for users attempting to log on | "Legal Warning:" |
| Interactive logon: Number of previous logons to cache (in case domain controller is not available) | 10 logons |

Microsoft Network Clientshow

| | |
|---|---|
| Microsoft network client: Digitally sign communications (always) | Enabled |
| Microsoft network client: Send unencrypted password to third-party SMB servers | Disabled |

Microsoft Network Servershow

| | |
|---|---|
| Microsoft network server: Digitally sign communications (always) | Enabled |

Network Accessshow

| | |
|---|---|
| Network access: Allow anonymous SID/Name translation | Disabled |
| Network access: Do not allow anonymous enumeration of SAM accounts and shares | Enabled |
| Network access: Let Everyone permissions apply to anonymous users | Disabled |

Network Securityshow

| | |
|---|---|
| Network security: Do not store LAN Manager hash value on next password change | Enabled |
| Network security: LAN Manager authentication level | Send NTLMv2 response only |
| Network security: LDAP client signing requirements | Require signing |

System Cryptographyshow

| | |
|---|---|
| System cryptography: Force strong key protection for user keys stored on the computer | User input is not required when new keys are stored and used |

SystemObjectsshow

| | |
|---|---|
| System objects: Strengthen default permissions of internal system objects (e.g. Symbolic Links) | Enabled |

-continued

Managed Forest Default Domain Policy

Event Logshow

| | |
|---|---|
| Maximum application log size | 65536 kilobytes |
| Maximum security log size | 262144 kilobytes |
| Maximum system log size | 65536 kilobytes |
| Prevent local guests group from accessing application log | Enabled |
| Prevent local guests group from accessing security log | Enabled |
| Prevent local guests group from accessing system log | Enabled |
| Retention method for application log | As needed |
| Retention method for security log | As needed |
| Retention method for system log | As needed |

System Servicesshow
Computer Browser (Startup Mode: Disabled)show

| Type | Name | Permission |
|---|---|---|

Permissions

| | | |
|---|---|---|
| Allow | BUILTIN\Administrators | Full Control |
| Allow | NT AUTHORITY\SYSTEM | Full Control |

Auditing

| Type | Name | Access |
|---|---|---|
| Failure | Everyone | Full Control |

| Policy | Setting |
|---|---|

Public Key Policies/Autoenrollment Settingsshow

| | |
|---|---|
| Enroll certificates automatically | Enabled |
| Renew expired certificates, update pending certificates, and remove revoked certificates | Disabled |
| Update certificates that use certificate templates | Disabled |

Public Key Policies/Encrypting File Systemshow
Propertiesshow

| | |
|---|---|
| Allow users to encrypt files using Encrypting File System (EFS) | Enabled |

Public Key Policies/Trusted Root Certification Authoritiesshow
Propertiesshow

| | |
|---|---|
| Allow users to select new root certification authorities (CAs) to trust | Enabled |
| Client computers can trust the following certificate stores | Third-Party Root Certification Authorities and Enterprise Root Certification Authorities |
| To perform certificate-based authentication of users and computers, CAs must meet the following criteria | Registered in Active Directory only |

Administrative Templateshide
Network/DNS Clientshow

| | |
|---|---|
| DNS Suffix Search List | Enabled |
| DNS Suffixes: | managed.com-panyx.com,int.com-panyx.com,com-panyx.com |

System/Group Policyshow

| | |
|---|---|
| Group Policy slow link detection | Enabled |
| Connection speed (Kbps): | 256 |
| Enter 0 to disable slow link detection. | |
| Scripts policy processing | Enabled |
| Allow processing across a slow network connection | Enabled |
| Do not apply during periodic background processing | Disabled |
| Process even if the Group Policy objects have not changed | Disabled |

-continued

Managed Forest Default Domain Policy

System/Scriptsshow

| | |
|---|---|
| Run logon scripts synchronously | Enabled |

Windows Components/NetMeetingshow

| | |
|---|---|
| Disable remote Desktop Sharing | Enabled |

Windows Components/Windows Updateshow

| | |
|---|---|
| Configure Automatic Updates | Enabled |
| Configure automatic updating: | 3 - Auto download and notify for install |
| The following settings are only required and applicable if 4 is selected. | |
| Scheduled install day: | 0 - Every day |
| Scheduled install time: | 03:00 |
| Specify intranet Microsoft uodate service location | Enabled |
| Set the intranet update service for detecting updates: | http://intranet |
| Set the intranet statistics server: (example: http://IntranetUpd01) | http://intranet |
| User Configuration (Enabled)hide | |
| Administrative Templateshide | |
| System/Scriptsshow | |

In a particular implementation of the policy management module 110, systems policies 116 are deployed to one or more domain controllers 118, from which they can be applied to various entities 120 within the enterprise 100. A domain controller 118 is typically embodied in a server computer and manages access to a set of network resources (e.g., applications, printers, user accounts and so forth) for a group of entities 120. For example, when deployed to the domain controllers 118, the systems policies 116 may enforce password requirements (e.g., number of characters, complexity, frequency of password update, etc.), logon requirements or limitations, resource access requirements or limitations, and others.

As discussed above, entities 120 include, but are not limited to, users, computers, user accounts, files, application programs, printers and other resources that may access or be accessed from the enterprise network. As shown, the entities 120 are typically arranged in groups that are associated with domains. The domain controller 118 for each domain uses a system policy or policies 116 associated with that domain to manage the access by entities 120 to other network-based entities.

In a particular implementation of the distributed enterprise 100, the domain controllers 118 and entities 120 are identified and managed using ACTIVE DIRECTORY by MICROSOFT CORPORATION. In this implementation, the domain controllers 118 maintain an identity store (not shown) having metadata that identifies the entities in the domain, and other domains. The ACTIVE DIRECTORY also includes Group Policy Objects (GPOs) that represent the systems policies 116. Using ACTIVE DIRECTORY, the published policies 104 and policy exceptions 114 can be implemented with standard GPOs and alternate GPOs, respectively.

As the enterprise 100 grows and changes, the policies will be managed to adapt to such growth and changes. Managing changes to policies is preferably controlled in a manner that ensures the viable, secure, ongoing operation of the enterprise 100. The published policies 104 can be updated and new published policies 104 added. In addition, existing systems policies 116 can be updated in response conditions in the enterprise domains. In the distributed enterprise 100, an entity 120 may determine that it would be useful or necessary to change a systems policy 116. In this event, a systems policy change request 122 is filled out and communicated to the IT center 106.

The IT center 106 then performs a policy change process in which the systems policy change request 120 is analyzed and a determination is made whether to implement the requested change. The policy change process includes a number of tasks or events carried out by the policy management module 110 and the IT personnel 108 who consider policy change criteria in making the determination. Policy change criteria include, but are not limited to, the impact of the requested change on published policies 104, the business need for the requested change, and the urgency of the requested change.

In addition when published policies 104 are changed, the policy management module 110 performs actions to ensure that existing, referenced system policies 116 are still valid in regards to the changed published policy 104. System policies 116 that are no longer valid are either retired or changed in accordance with the changes to the published policies 104. Every system policy 116 has at least one published policy 104 assigned to it. The policy management module 110 identifies any "orphaned" system policies (i.e., a system policy without an assigned published policy). If an orphaned system policy is identified, it is flagged for further investigation. IT personnel 108 determine whether to change or retire any flagged system policies 116.

In accordance with one implementation of the policy library 112, a policy can have limited time duration, meaning that the policy is applicable for only a limited time. Time-limited policies may be particularly relevant to policy exceptions 114, but may also apply to published policies 104. When a policy is time-limited, the policy is said to have a "time-to-live" (TTL). The policy library 112 maintains TTL data in the form of an expiration date, which may be used by the policy management module 110 to alert IT personnel 108 when a policy expires. In response to the alert, the IT personnel 108 can take action, such as remove or edit the expired policy. The expiration date is discussed in further detail with respect to FIG. 2 below.

Published policies 104 apply in a one-to-many approach, and serve to enforce the requirements and recommendations of various groups (e.g., corporate security, IT administration) within the enterprise 100. However, there may be situations where published policies 104 cannot be applied—such as for a software test organization that must test multiple antivirus vendor offerings (not just the "approved" antivirus software). In these situations, an exemption to corporate policies must be obtained, resulting in policy exceptions 114.

Most policy exceptions 114 result from a business need. An exceptions database is created and maintained by the exception approver. The exception requestor provides the approver with business justification, duration, and specific settings of the policy exception (published policy and/or systems policy). Upon risk assessment and business justification review, the policy exception 114 may be granted and recorded in the exception database. Each policy exception is typically assigned a time-to-live (TTL) value, which specifies the duration of the policy exception.

In a particular implementation, a TTL is required for an exception to a security policy. Typically, a maximum TTL is enforced based upon the security/business impact of granting an exception to a particular policy. Exception approver determines the TTL (within maximum TTL allowed) for a specific request.

Knowledge of the state of systems policies 116 for any entity 120 is important for maintaining a robust, flexible, secure policies infrastructure. The policy management module 110 and the policy library 112 together provide tools for learning the state of systems policies 116. Exemplary tools and attributes determinative of the state of system policies 112 include, but are not limited to the following:

Reference links between published policies 104 and systems policies 116.

Aggregate set of systems policies 116 associated with any user/computer combination. The aggregate set is referred to as the resultant set of policies (RSOP).

A means of querying calculating the RSOP for any entity 120, or combination of user and systems policies 116.

Knowledge of when systems policy was successfully applied to each entity 120.

The next time that systems policy 116 will be applied to each entity.

The authority from which each systems policy was distributed to each entity.

The policy management module 110 also support the IT personnel 108 by identifying any newly staged system policy 116 that conflicts with, or is rendered unnecessary by, an existing system policy 116. By way of example, but not limitation, the policy management module 110 will identify an existing system policy at a higher scoped level, which would make a new system policy at a lower level unnecessary. Alternatively, the policy management module 110 also identifies any existing system policies that are rendered obsolete by a new system policy. If an existing system policy is rendered obsolete, it can be retired.

Figure 5:
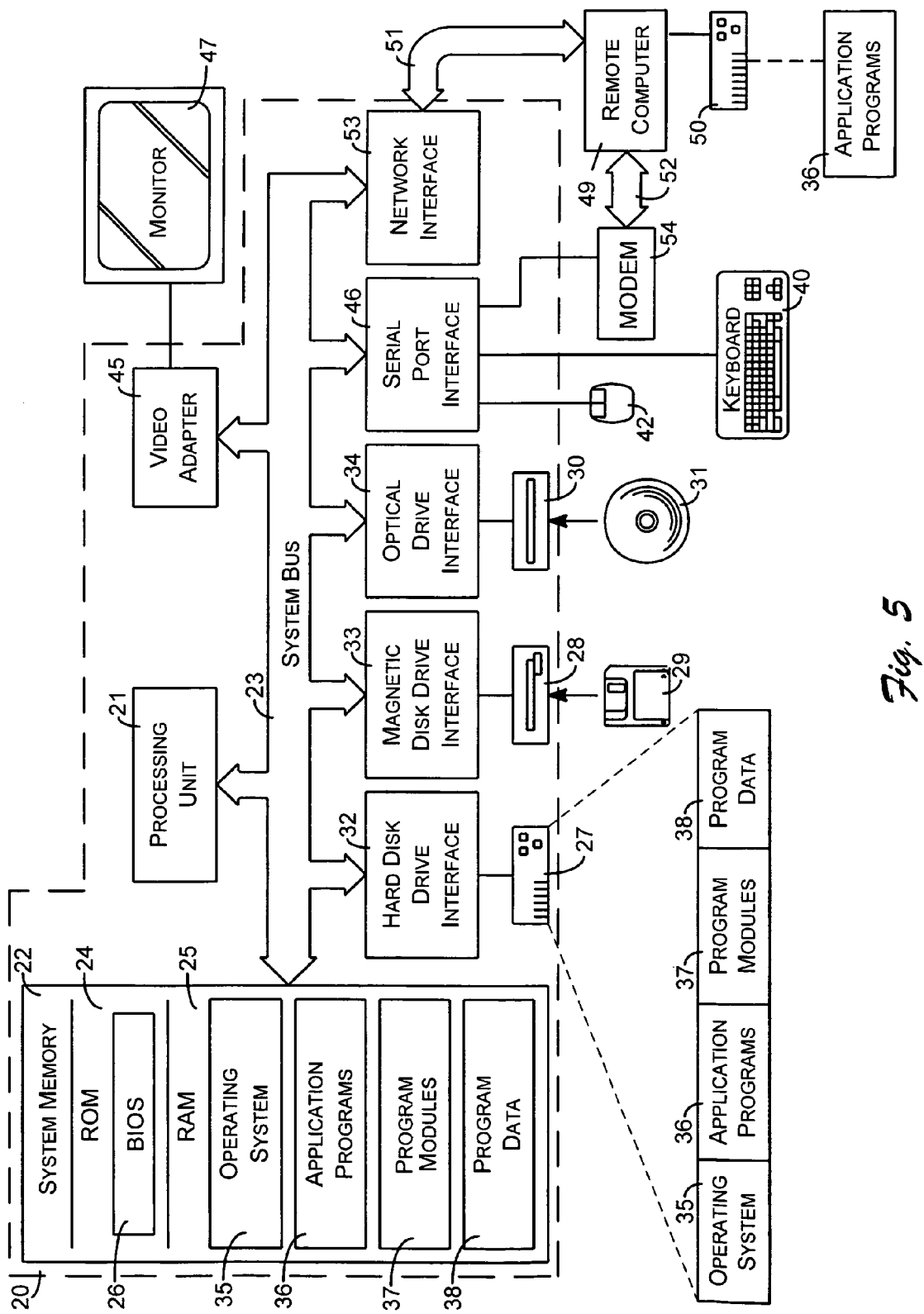
FIG. 5 illustrates a general purpose computer and environment that can be used to implement policy management systems and processes described herein.

Modules (e.g. policy management module 110, domain controller 118, entities 120) shown in FIG. 1 may be implemented with any of various types of computing devices known in the art, depending on the particular implementation, such as, but not limited to, a desktop computer, a laptop computer, a personal digital assistant (PDA), a handheld computer, or a cellular telephone. The computing devices typically communicate via a network (not shown), which may be wired or wireless. In addition, the computing devices may be arranged in any convenient configuration, such as, but not limited to client/server and peer-to-peer configurations. Modules shown in FIG. 1 can be implemented in software or hardware or any combination of software or hardware. FIG. 5, discussed in detail below, illustrates a computing environment that may be used to implement the computing devices, applications, program modules, networks, and data discussed with respect to FIG. 1.

FIG. 2 illustrates exemplary metadata that describe systems policies. The metadata is in the form of attributes 200 from an exemplary policy library. The exemplary policy library attributes 200 are for illustrative purposes and are not intended to limit the scope of the claimed subject matter in any way. Thus, while the illustrated policy library attributes 200 relate to a corporate network domain, the policy library attributes of other implementations may relate to other domains. In addition, other implementations of policy libraries may include more, fewer, or different policy data/attributes than are shown in the exemplary policy library attributes 200.

The policy library attributes 200 may be stored in a relational database or memory and presented to a user in a format, such as the tabular format in FIG. 2, or any other convenient format. As shown, the exemplary policy library attributes 200 are presented in a two-column table and grouped by policy name. For example, a first policy 202 is named "WW-DOMAIN-PASSWORD-REQUIREMENTS GPO". Another exemplary policy 204 is named "OU-LAB-ANTIVIRUS GPO".

The exemplary attributes include a root domain 208, a purpose 208, a filter 210, a requestor identifier 212, a request date 214, an expiration date 216, a deployment date.218, and a policy contact 220. The root domain 206 attribute indicates a primary domain name, directory name, OU, or site name to which the policy relates. The purpose attribute 208 is a brief description of the purpose for the systems policy. The filter attribute 210 is a brief description of the users in the enterprise to whom the systems policy applies. The requestor attribute 212 identifies the entity, user, or group who requested the systems policy. The request date 214 indicates when the systems policy was requested. The deployment date 218 is a date when the systems policy was deployed. The policy contact 220 indicates contact information related to the systems policy.

With particular regard to the expiration date 216, a date can be provided that corresponds to when the systems policy will expire. The expiration date 216 can be used for "life cycle" management of the systems policy. For life cycle management, it is often necessary to determine when systems policies should be updated or removed from deployment. Considerations that may be relevant to determining the expiration date are:

systems policy no longer corresponds to any published policies.
systems policy is no longer required by the original requestor.
systems policy must be updated in or removed from the existing IT environment.

In a particular implementation of a systems policy change process, the policy library is queried for the expiration date 216. For systems policies that include an expiration date, an alert is sent to IT personnel on or before the expiration date to notify the IT personnel that the expiration of the system policy is imminent. In response, the IT personnel can take some action with respect to the systems policy, such as updating and/or removing the systems policy. Such removal or clean-up of expired policies can help ensure that the policy library 112 (FIG. 1) and domain controllers 120 (FIG. 1) do not become cluttered with forgotten, unused, and often inconsistent policies and ensures that user experience is consistent with current published policy.

Exemplary Operations

Figure 3:
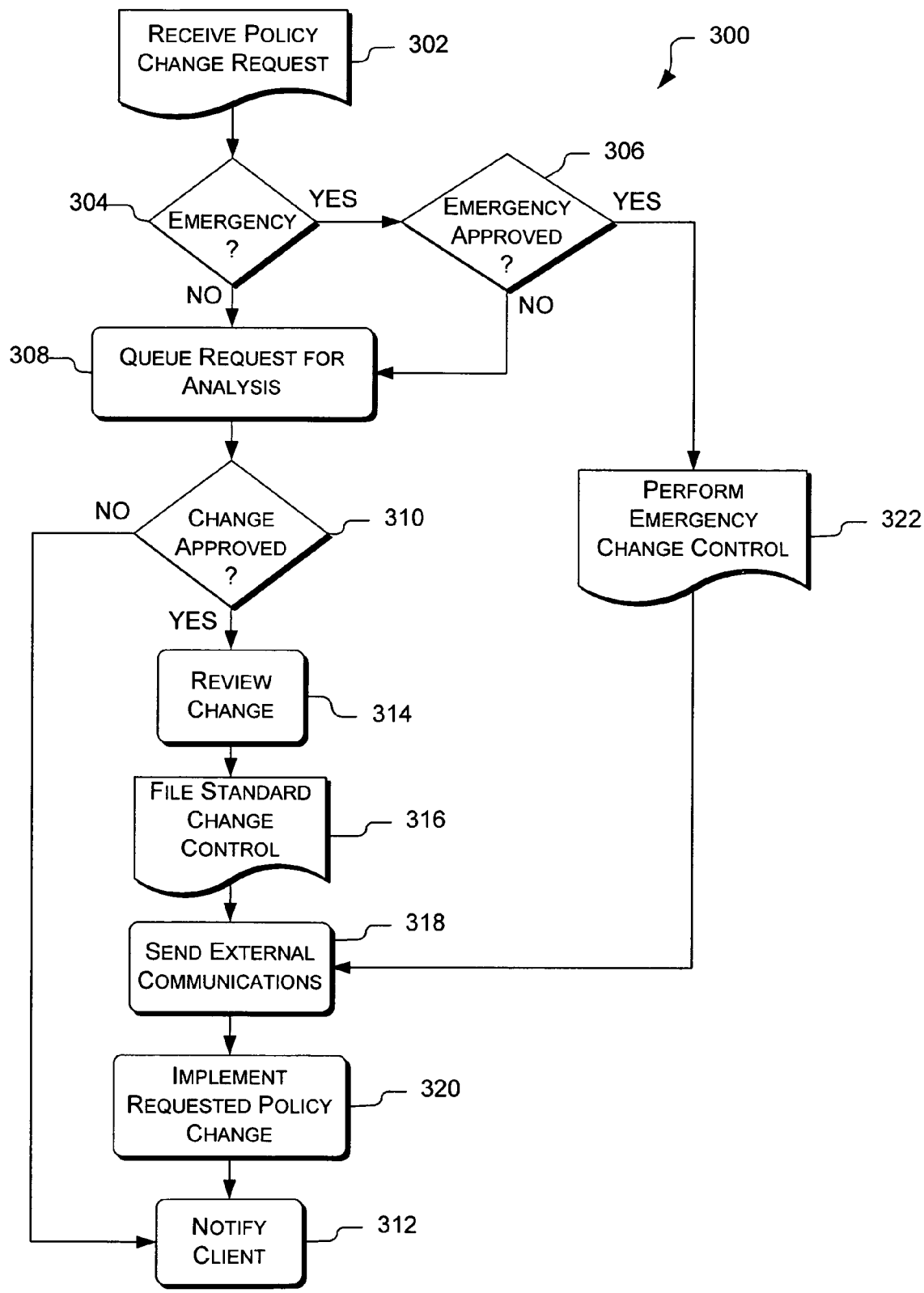
FIGS. 3-4 illustrate an exemplary processes for governing changes to systems policies based on published policies.

FIG. 3 illustrates an exemplary policy change management process 300 for managing changes to systems policies based on published policies and policy exceptions. The policy change management process 300 can be carried out by the systems shown in FIG. 1 and FIG. 2. Alternatively, the policy change management process 300 can be carried out by systems other than those shown in FIG. 1 and FIG. 2. It is assumed that systems policies have been applied in an enterprise and an entity completes and submits a systems policy change request.

A receiving operation 302 receives the request for a change to a systems policy. Typically, a client sends the completed policy change request form to the IT center. The receiving operation 302 can involve receiving the policy change request form in an electronic message, such as an e-mail message, or web page form submission. The receiving operation 302 may also involve receiving a paper printout of the policy change request form.

In a determining operation 304, the IT center initially determines whether the client considers the requested systems policy change to be an emergency, which will require faster than normal response time by the IT center. Typically, the policy change request form will include some indicator (e.g., a checkbox) whereby the requesting client can indicate that the requested change is an emergency. The client must also provide justification (e.g., business necessity) for the emergency treatment. Based on the indicator and justification, the IT center will determine if the policy change request should be treated as an emergency and handled in a faster than normal fashion.

If the policy change request indicates that the change is an emergency, the process branches "YES" to another determining operation 306. The determining operation 306 determines whether the justification for the emergency treatment is sufficient. The determining operation 306 typically requires approval from higher level IT personnel, such as the IT director, and/or the requestor's director or equivalent personnel level. In the determining operation 306, certain justifications are considered sufficient, such as a work stoppage issue, business stoppage issue, or a security issue. Other justifications may be sufficient, and still others are not considered sufficient, at the discretion of the director.

If the change request is not an emergency, the policy change management process 300 branches to a queuing operation 308. The queuing operation 308 queues or schedules the system policy change request for analysis. Typically, a list of current system policy change requests is maintained and the change requests are processed in a first-in, first-out order. However, this need not be the case and other orders of processing may be used.

Figure 4:
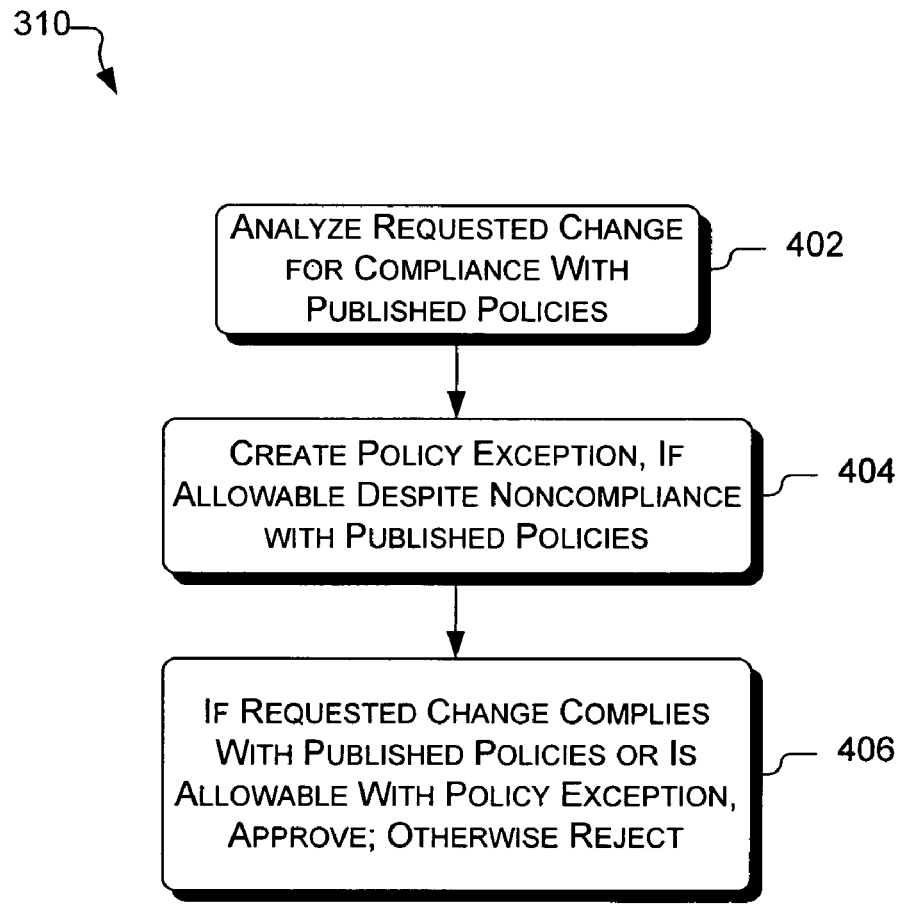

A determining operation 310 analyzes the requested systems change and determines whether the change is approved or rejected. The determining operation 310 analyzes the change request with respect to policy management criteria. An exemplary policy change analysis process is shown in FIG. 4 and described below. If the system policy change request is not approved, the process 300 branches "NO" to a notifying operation 312, which notifies the requesting client that the change request was rejected. The notifying operation 312 can include reasons why the change request was rejected and/or suggestions as to how the request could be modified for approval.

If the change request is approved, the process 300 branches "YES" to a reviewing operation 314. The reviewing operation notifies all personnel in the IT group as to the system policy change. The reviewing operation 314 gives the IT personnel a chance to review the change and comment on the change.

A filing operation 316 files a change request with a change control group in the enterprise. Typically, distributed enterprises have a controlled change process wherein changes to documents, systems, etc. are entered in a controlled fashion. The filing operation 316 schedules the systems policy change to be deployed in a certain, standard time period. For example, in one implementation, the systems policy change will be deployed not sooner than seven days from filing the change control request.

A sending operation 318 sends external communications to groups throughout the enterprise notifying the groups that the change will be taking place. The sending operation 318 is typically in the form of electronic messages, but can also be carried out by paper communications, telephonic communications, and others. The sending operation 318 includes routine notification meetings with key IT personnel and an electronic report to key IT personnel detailing all upcoming changes. In addition, upcoming changes are communicated via change advisory board meetings and through enterprise members' subscription to notification services.

An implementing operation 320 implements the system policy change. The implementing operation 320 makes changes to the systems policy as specified by the change request and deploys the updated systems policy to appropriate domain controllers. After the systems policy change request is implemented, the requesting client is notified by the notifying operation 312 that the requested systems policy change was approved and implemented.

Returning to the emergency determining operation 306, if the emergency is approved, the process 300 branches "YES" to a performing operation 322. The performing operation 322 files change control documents to make the requested change in an expedited fashion. Thus, the systems policy change will become a high priority change and not require the standard time delay associated with standard change control. After the performing operation 322, the sending operation 318, implementing operation 320, and notifying operation 312 are performed as described above.

FIG. 4 illustrates an exemplary systems policy change analysis process 310. The systems policy change analysis process 310 can be performed by the IT center shown in FIG. 1 or other systems. Prior to the systems policy change analysis process 310, it is assumed that a systems policy change request has been received, which suggest some change to a systems policy. The change can suggest changes such as, but not limited to, password length/format, access rights to network-based resources, changes in antivirus settings, and so on.

An analyzing operation 402 analyzes the requested change(s) for compliance with the published policies. In the analyzing operation 402, references between the systems policies and the published policies are used to determine whether a proposed systems change is allowable. Using the reference between the two types of policies, IT personnel can quickly identify the published policies that correspond to a systems policy that is proposed to be changed. The IT personnel review the proposed change and the corresponding published policies, to determine whether the proposed change violates any of the published policies. Often, the analyzing operation 402 considers the business need for the proposed systems policy change. The business need includes, but is not limited to, the role and/or responsibility of the requesting client with respect to the published policies.

If the requested policy change is not in compliance with published policies 404, the requested change may nonetheless be allowable. In such a case, a policy exception may be approved so that the requested systems policy change can be implemented. A creating operation 404 creates the policy exception. This typically involves approval from IT security personnel, or some other exception approval entity. The policy exception is associated with the system policy change and may have a corresponding TTL value (e.g., 6 months, 1 year) when the policy exception will expire.

An approving/rejecting operation 406 approves the requested change if either the requested change complies with published policies or a policy exception was generated. Alternatively, if the requested change does not comply with published policies and a policy exception was not approved, the approving/rejecting operation 406 rejects the requested systems policy change.

Exemplary Computing Device

With reference to FIG. 5, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 5 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of various modules and techniques described herein may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although an exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method for managing system policies in a distributed enterprise, the method comprising:
    receiving a systems policy change request to change a systems policy that implements a published enterprise policy in the distributed enterprise, wherein the published enterprise policy comprises:
        defined boundaries of allowable password constructions;
        defined boundaries of password retention duration;
        a definition of allowed application program licenses;
        defined boundaries of anti-virus software configuration and operation; and
        defined boundaries of privileged and entitled access permissions to resources in the distributed enterprise; and
    wherein the systems policy presents a mechanism for implementing the published enterprise policy into enforceable system and user configurations;
    determining whether the requested systems policy change complies with the published enterprise policy and is not rendered unnecessary by another systems policy in the distributed enterprise; and
    updating the systems policy according to the requested systems policy change if the requested system policy change complies with the published enterprise policy and is not rendered unnecessary by another systems policy in the distributed enterprise,
    wherein the systems policy is stored in a memory.

2. A method as recited in claim 1 further comprising:
    assessing a business justification for the requested systems policy change; and
    issuing an approval or a denial notification for the requested systems policy change.

3. A method as recited in claim 1 further comprising:
    determining whether a systems policy will be flagged as a result of a change to the systems policy; and
    investigating flagged systems policies.

4. A method as recited in claim 1 further comprising:
    determining whether a policy exception is approved if the requested systems policy change does not comply with the published enterprise policy; and
    generating a policy exception associated with the requested systems policy change if the policy exception is approved.

5. A method as recited in claim 4 further comprising:
    associating a time duration with the policy exception; and
    prior to expiration of the time duration, alerting a user to an imminent expiration of the policy exception.

6. A method as recited in claim 1 further comprising:
    determining whether the requested systems policy change is an emergency;
    implementing the requested systems policy change in an expedited time period if the requested systems policy change is an emergency; and
    implementing the requested systems policy change in a standard time period if the requested systems policy change is not an emergency.

7. A method as recited in claim 1 further comprising deploying a Group Policy Object (GPO) in a container in a predetermined format, the GPO comprising the updated systems policy.

8. A method as recited in claim 1 further comprising:
    storing the published enterprise policy and the systems policy in a policy library; and storing policy attributes and one or more policy exceptions in the policy library, wherein one of the policy attributes is an expiration date specifying when one of the policy exceptions will expire.

9. A method as recited in claim 1 further comprising linking one or more systems policies to each of multiple published enterprise policies.

10. A method as recited in claim 1, wherein the determining operation further comprises analyzing policy criteria related to the published enterprise policy, the policy criteria comprising one or more of the following:
   a business need;
   urgency of the requested systems policy change;
   responsibility of the requestor; and
   impact of the requested systems policy change on the published enterprise policy.

11. A method as recited in claim 1 wherein the receiving operation comprises receiving the systems policy change request in one of the following forms:
   an email message;
   a web page submission;
   a printer paper form.

12. One or more computer storage media having computer-executable instructions that, when executed, cause a computer to perform a process comprising:
   receiving one or more published policies setting forth enterprise guidelines in a distributed enterprise, wherein the enterprise guidelines of the one or more published policies comprise:
      defined boundaries of allowable password constructions;
      defined boundaries of password retention duration;
      a definition of allowed application program licenses;
      defined boundaries of anti-virus software configuration and operation;
      defined boundaries on secure access configurations; and
      defined boundaries of privileged and entitled access permissions; and
   for each published policy, generating one or more corresponding systems policies containing configuration settings for implementing the published policy, wherein the one or more corresponding systems policies present a mechanism for implementing the one or more published policies into enforceable system and user configurations in the distributed enterprise;
   applying the one or more systems policies to an entity in the distributed enterprise;
   receiving a policy change request requesting to change a systems policy; identifying when:
      the policy change request does not violate a published policy;
      the policy change request is rendered unnecessary by another systems policy; and
      another systems policy is rendered obsolete by implementing the policy change request; and
   processing the policy change request based on the identifying, the processing comprising:
   implementing the requested change to the systems policy when the requested change does not violate a published policy and the requested change is not rendered unnecessary by another systems policy.

13. One or more computer storage media as recited in claim 12, the process further comprising generating a policy exception corresponding to one of the systems policies.

14. One or more computer storage media as recited in claim 12 the process further comprising:

generating a policy exception if the requested change to the systems policy violates a published policy, and the requested change is allowable;
   associating the policy exception with the systems policy; and
   implementing the systems policy with the requested change.

15. One or more computer storage media as recited in claim 12, the process further comprising:
   generating a policy exception associated with a system policy;
   storing an expiration date associated with the policy exception; and
   alerting a user on or before the expiration date that the policy exception will imminently expire.

16. One or more computer storage media as recited in claim 12, the process further comprising:
   determining whether the systems policy change request is an emergency;
   implementing the systems policy change in an expedited manner if the systems policy change is an emergency; and
   implementing the systems policy change in a standard manner if the systems policy change is not an emergency.

17. A system for managing policies in an enterprise, the system comprising:
   a policy management module configured for creating a reference between a published policy and a corresponding systems policy having data for implementing the published policy, wherein the policy management module is further configured to:
      identify when the corresponding systems policy conflicts with the published policy;
      identify when the corresponding systems policy is rendered unnecessary by another systems policy; and
      identify when another systems policy is rendered obsolete by the corresponding systems policy; and
   a policy library storing the published policy and the systems policy, and
   wherein the published policy comprises:
      defined boundaries of allowable password constructions;
      defined boundaries of password retention duration;
      a definition of allowed application program licenses;
      defined boundaries of anti-virus software configuration and operation; and
      defined boundaries of privileged and entitled access permissions to resources in the enterprise; and
   wherein the systems policy presents a mechanism for implementing the published policy into enforceable system and user configurations.

18. A system as recited in claim 17, wherein the policy management module is further configured to receive a policy change request and enable user editing of a systems policy based on the policy change request.

19. A system as recited in claim 18, wherein the policy management module is further configured to generate a policy exception corresponding to the systems policy, the policy exception generated corresponding to the systems policy that is not associated with the published policy, the policy exception being stored in the policy library and having an expiration date stored in the policy library and the policy management module alerting a user of the expiration of the policy exception based on the expiration date.

* * * * *